United States Patent [19]

Albers et al.

[11] Patent Number: 5,129,920
[45] Date of Patent: Jul. 14, 1992

[54] GAS SEPARATION APPARATUS AND ALSO METHOD FOR SEPARATING GASES BY MEANS OF SUCH AN APPARATUS

[75] Inventors: Johannes H. M. Albers, Rijswijk; Jacob Smid, Delft; Arnoldus P. M. Kusters, Etten-Leur, all of Netherlands

[73] Assignee: Delair Droogtechniek en Luchtbehandeling B.V., An Etten-Leur, Netherlands

[21] Appl. No.: 687,766

[22] Filed: Apr. 18, 1991

Related U.S. Application Data

[63] Continuation of Ser. No. 492,209, Mar. 12, 1990, abandoned, which is a continuation of Ser. No. 215,550, Jul. 6, 1988, abandoned.

[30] Foreign Application Priority Data

Jul. 7, 1987 [NL] Netherlands ............... 8701598

[51] Int. Cl.$^5$ .................. B01D 53/22; B01D 69/08
[52] U.S. Cl. ................................ 55/16; 55/68; 55/158; 55/528
[58] Field of Search ............ 55/16, 68, 158, 522, 55/528; 210/500.23

[56] References Cited

U.S. PATENT DOCUMENTS

| | | | |
|---|---|---|---|
| 3,350,844 | 11/1967 | Robb | 55/16 |
| 3,709,774 | 1/1973 | Kimura | 55/16 X |
| 3,735,559 | 5/1973 | Salemme | 55/16 |
| 3,780,496 | 12/1973 | Ward, III et al. | 55/16 |
| 3,852,388 | 12/1974 | Kimura | 55/16 X |
| 3,874,986 | 4/1975 | Browall et al. | 55/158 X |
| 3,980,456 | 9/1976 | Browall | 55/16 X |
| 4,209,307 | 6/1980 | Leonard | 55/16 |
| 4,468,500 | 8/1984 | Malon et al. | 55/16 X |
| 4,468,501 | 8/1984 | Zampini et al. | 55/16 X |
| 4,468,502 | 8/1984 | Malon et al. | 55/16 X |
| 4,468,503 | 8/1984 | Zampini et al. | 55/16 X |
| 4,472,175 | 9/1984 | Malon et al. | 55/16 |
| 4,486,202 | 12/1984 | Malon et al. | 55/158 |
| 4,488,886 | 12/1984 | Zampini | 55/158 |
| 4,497,640 | 2/1985 | Fournié et al. | 55/16 |
| 4,521,224 | 6/1985 | Li | 55/16 |
| 4,530,703 | 7/1985 | Malon et al. | 55/16 |
| 4,551,156 | 11/1985 | Li | 55/16 |
| 4,586,939 | 5/1986 | Li | 55/16 |
| 4,596,860 | 6/1986 | Percec et al. | 55/16 X |
| 4,612,019 | 9/1986 | Langhorst | 55/16 |
| 4,647,297 | 3/1987 | Zampini | 55/16 X |
| 4,652,283 | 3/1987 | Zampini et al. | 55/16 X |
| 4,684,376 | 8/1987 | Percec et al. | 55/16 |
| 4,699,634 | 10/1987 | Percec et al. | 55/16 |
| 4,701,186 | 10/1987 | Zampini | 55/16 X |
| 4,718,921 | 1/1988 | Makino et al. | 55/16 |
| 4,746,476 | 5/1988 | Kohn | 55/16 X |

FOREIGN PATENT DOCUMENTS

| | | |
|---|---|---|
| 0134055 | 3/1985 | European Pat. Off. |
| 0159783 | 10/1985 | European Pat. Off. |
| 2560784 | 9/1985 | France |
| 57-117321 | 7/1982 | Japan ............... 55/158 |
| 61-018402 | 1/1986 | Japan ............... 55/158 |

OTHER PUBLICATIONS

Dutch Search Report for Ducth Application No. 8701598, including a translation thereof.

*Primary Examiner*—Robert Spitzer
*Attorney, Agent, or Firm*—Webb, Burden, Ziesenheim & Webb

[57] ABSTRACT

Gas separation apparatus constructed from a module comprising a bundle of asymmetric hollow fibres of poly(2,6-dimethyl-p-phenylene oxide) having the high molecular weight $\overline{M}w$ of $10^5$-$5.10^6$. The hollow fibres in question produced by coagulation spinning consist of a relatively thick porous layer which offers hardly any resistance to gas permeation and a very dense but thin top layer responsible for the actual favorable gas separation achieved.

10 Claims, 1 Drawing Sheet

GAS SEPARATION APPARATUS AND ALSO METHOD FOR SEPARATING GASES BY MEANS OF SUCH AN APPARATUS

This application is a continuation of co-pending U.S. application Ser. No. 07/492,209 filed on Mar. 12, 1990, now abandoned, which is a continuation of co-pending U.S. application Ser. No. 07/215,550 filed on Jul 6, 1988, now abandoned.

The invention relates to an apparatus for separating gases, in particular for separating water vapour from air.

Such an apparatus is known from U.S. Pat. No. 4,612,019. More particularly, said patent relates to an apparatus for separating water vapour from air samples, the apparatus comprising a housing which is impermeable to water vapour, which housing is internally provided with one or more hollow fibre membranes which are readily permeable for water vapour and have very poor permeability for other gases such as, for example, carbon monooxide, carbon dioxide, hydrogen chloride and the like, the inlet or outlet side of the hollow fibre membranes emerging both at one side and at the other side of the housing. Apart from the hollow fibres, the housing comprises in the remaining space a drying agent which at least partially surrounds the hollow fibres. Because of the water vapour concentration gradient between the inside of the hollow fibre and the remaining part of the housing due to the drying agent, a permeation of water vapour takes place from the inside of the hollow fibre to the space in which the drying agent is situated. As an example of a material which is suitable for hollow fibres mention is made of polytetrafluoroethylene substituted by perfluorosulphonic acid which is marketed under the name of "Nafion". The air samples with the water vapour substantially removed can then be investigated for gases present in the air.

U.S. Pat. No. 3,874,986 relates to a microporous substrates of polycarbonate or polyvinyl chloride/acrylonitrile polymer which provides mechanical strength and is provided with a non-porous polyphenylene oxide/organopolysiloxane-polycarbonate copolymer film and an organopolysiloxane-polycarbonate copolymer in between as an adhesive layer. Such membranes can be used for separating oxygen and nitrogen. The actual separation is carried out by means of the polyphenylene oxide/organopolysiloxane-polycarbonate copolymer film. The manufacture of such membranes comprises the preparation of the microporous substrate, after which one or more relatively permeable adhesive layers and subsequently one or more non-porous polyphenylene oxide/organopolysiloxane-polycarbonate layers are provided under the influence of reduced pressure. Such a method is, however, evaluated as laborious.

European Patent Application 0,134,055 likewise relates to composite gas separation membranse consisting of three layers of namely (a) a porous carrier with (b) a non-porous intermediate layer thereon, which layer is provided with a (c) specific separation layer, which last layer has a high selectively with respect to a particular gas or gas mixture. The carrier material, which contains pores having a diameter in the range from 1 nm to 1 $\mu$m, may have the form of a hollow fibre. It can also be stated with respect to such a membrane that the manufacture thereof can be considered troublesome since different layers have to be applied with a very small thickness on a porous underlayer.

European Patent Application 0,159,783 describes a method for separating water vapour from a gas mixture which contains water vapour and methane. The membrane described in this patent application is composed essentially of a specific urethane-amino acid copolymer. The membrane may have a thickness of 1-500 $\mu$m and also the form of a hollow fibre.

In addition, membranes are known from U.S. Pat. No. 4,586,939 which are used for separating gases. More particularly, said American patent relates, inter alia, to membranes which are synthesized from 80-95 mol-% of poly(2,6-dimethyl-p-phenylene oxide) units and 5-20 mol-% of poly(2,3,6-trimethylphenylene oxide) units. According to information on said patent, the average molecular weight of the substituted polyphenylene oxide polymers is 10,000 or over, preferably 30,000-300,000. In the exemplary embodiments, use is made of a commercially available polyphenylene oxide which has a molecular weight of 40,000. To prepare the brominated poly(2,6-dimethyl-p-phenylene oxide) products also reported in said U.S. patent, the poly(2,6-dimethyl-p-phenylene oxide) which is commercially available and also has a molecular weight of 40,000 is subjected to a bromination.

In said U.S. Pat. No. 4,586,939, membrane based on polyphenylene oxide are used as comparison membranes. It appears from tests, however, that said membranes based on polyphenylene oxide have less gas mixture separating properties than the abovementioned membranes containing substituted polyphenylene oxide according to said U.S. patent. The membranes used in these tests had a film thickness of 1-2 mils (25-50 $\mu$m) and were obtained by pouring out a solution of the respective polymer material onto a glass plate, the mixture being dried to form a membrane after a uniform thickness had been established.

Surprisingly, it has now been found that poly(2,6-dimethyl-p-phenylene oxide), hereinafter termed polyphenylene oxide, is also extremely suitable as such as a membrane material for separating gases. More particularly, the polyphenylene oxide should in this case have the very high molecular weight of $10^5 - 5 \times 10^6$ and be converted to the form of an asymmetric hollow fibre. Such as asymmetric hollow fibre consists of a relatively thick porous layer which offers hardly any resistance to the gas permeation but does provide mechanical strength, and a very thin top layer which brings about the actual gas separation.

The invention therefore relates to a gas separation apparatus constructed from a module comprising a bundle of hollow fibres of polyphenylene oxide and provided with an inlet for the gas mixture to be separated and two outlets for the separated gas products, the apparatus being characterized in that the module contains asymmetric hollow fibres of polyphenylene oxide having a weight-averaged molecular weight $\overline{M}w$ of $10^5 - 5 \times 10^6$, the thickness of the dense top layer having a value of 0.1-5 $\mu$m.

More particularly, the invention relates to a gas separation apparatus in which asymmetric hollow fibres of polyphenylene oxide having a weight-averaged molecular weight $\overline{M}w$ of $2 \times 10^5 - 8 \times 10^5$ are present. Preferably the thickness of the top layer is 0.1-2 $\mu$m. Optimum results can therefore be obtained if the gas separation apparatus according to the invention contains asymmetric hollow fibres of polyphenylene oxide having an $\overline{M}w$ of $2 \times 10^5 - 8 \times 10^5$ and the thickness of the top layer has the abovementioned value of 0.1-2 μm, very particularly 0.1-1 μm.

In addition, the invention relates to a method for drying gases such as compressed air in which the gas to be dried is passed through a gas separation apparatus according to the invention.

Finally the invention relates to the asymmetric hollow fibres to be used in the gas separation apparatus according to the invention which are constructed from polyphenylene oxide having an $\overline{M}w$ of $10^5 \cdot 5 \times 10^6$, advantageously $2 \times 10^5 - 8 \times 10^5$, and the thickness of the top layer of which is 0.1-5 μm, preferably 0.1-2 μm.

The principle of gas separation by means of asymmetric hollow fibres is known as such, for example from the book entitled "Kunststoffen 1986, Terugblic en Toekomst38 ("Plastics 1986, Historical Review and Future") by the Applicant (1986), pages 329-336, which has been distributed on a very limited scale. In said publication, for example, hollow asymmetric fibres of polyphenylene oxide are mentioned, without any indication, however, of the required molecular weight of the polymer and also of the thickness of the top layer.

The asymmetric hollow fibres according to the invention have the following advantages:
- in contrast to flat membranes, the hollow fibres according to the invention do not require any support;
- the spinning process for preparing the asymmetric hollow fibres is simple and reproducible;
- a very large membrane surface per volume can be achieved using hollow fibres;
- by achieving a very thin, dense to layer the flux of the gas to be separated can be optimized while maintaining the separation coefficient.

Figure 1:
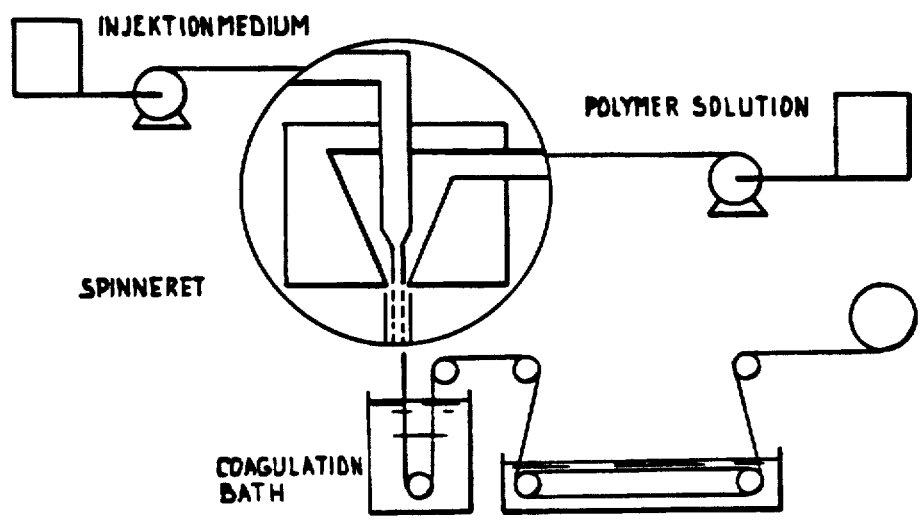
FIG. 1 is a schematic of a coagulation spin apparatus used to manufacture a symmetric hollow fibres.

The asymmetric hollow fibres according to the invention can be manufactured by means of a coagulation spin apparatus as shown in FIG. 1. In this coagulation spinning, a polymer solution is spun through an annular channel. The inside of the said channel consists of a hollow needle through which an injection medium is metered via a separate inlet system. Said injection medium may, for example, be composed of air, a coagulant or a coagulant/solvent combination. The spun fibre which emerges from the spinning head first preferably passes through an air slit before it comes into contact with the coagulation bath.

Depending on the process parameters, the hollow fibres manufactured in coagulation spinning may have an outside diameter of 0.030-0.090 cm, an inside diameter of 0.015-0.045 cm and a top layer of 0.1-5 μm. For example, an asymmetric hollow fibre of polyphenylene oxide (molecular weight approximately $5 \times 10^5$) with an outside diameter of 0.060 cm, an inside diameter of 0.030 cm, a top layer of 1 μm and an $O_2/N_2$ separation coefficient of 5 has an oxygen flux of $10^{-5}$ ml (STP)/cm².sec. cm Hg.

Since the top layer, as has been mentioned, of the asymmetric hollow fibres according to the invention brings about the actual gas separation, it is clear that the homogeneity of the compact but relatively thin top layer of 0.1 μm and over is a requirement, i.e. the top layer must not have any deficiencies such as pores etc. under any conditions. Such deficiencies in the top layer will, after all, at least substantially destroy the desired gas separation. This requirement is amply fulfilled by the polyphenylene oxide used according to the invention and having the abovementioned high $\overline{M}w$ of $10^5 - 5 \times 10^6$.

Figure 2:
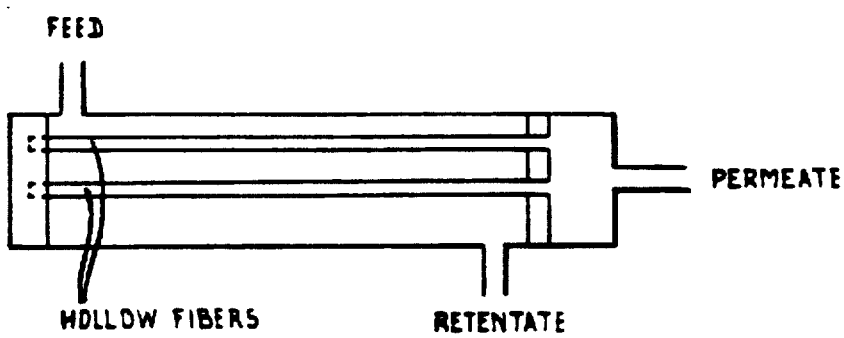
FIG. 2 is a cross-sectional view of a module of asymmetric hollow fibres assembled according to the invention.

The asymmetric hollow fibres according to the invention can be assembled in bundles of 2-5,000 and over, for example 1,000 fibres, in a module. A diagram of a module according to the invention is shown in FIG. 2. More particularly, a module comprises an inlet for the gas mixture to be separated and two outlets for the permeate, on the one hand, and the retentate, on the other hand. If desired, several modules may also be connected in a series with each other in order to obtain a still more optimum gas separation.

The gas separation according to the invention has a wide variety of advantages, such as:
- the space requirement of the apparatus is small;
- the capacity of the module or modules can be adjusted according to the requirement;
- the capital investment is normally low; and
- as a result of the absence of ab/adsorption agents, the method is environmentally harmless.

The invention is described on the basis of the example below; this example should not be interpreted as restrictive.

EXAMPLE

Hollow fibres having an asymmetric structure were spun from a spinning solution of 20-25% polyphenylene oxide (PPO), 50-70% trichloroethylene and 12-20% ethylhexanol. The molecular weight of the PPO was varied on accordance with the values shown in Table A.

The spun fibres first pass through an air slit of approximately seven centimetres before reaching the methanol coagulation bath (see FIG. 1). After the coagulation bath, the fibres were rinsed and dried. The fibres had an outside and inside diameter of 0.6 and 0.5 mm respectively. After drying, pieces of fibre having a length of approximately 1 m were manufactured. The pieces of fibre were sealed at one end and provided with connecting pieces at the other end for a measuring cell. The fibres were tested in a standard cell in which the open ends of the fibres were connected to a Brooks thermal mass flowmeter, model 5850 TRC. The pressure outside the hollow fibres was 0.5-6.0 atmospheres (atm) gauge pressure, while the pressure on the inside was atmospheric in all cases.

The reduced permeability (P-red) was calculated by means of the equation (1) below.

$$P\text{-red} = F/(\Delta p \cdot A)(cm^3/cm^2 \cdot cm\ Hg) \tag{1}$$

where F is the gas flow through the fibre wall ($cm^3/s$), $\Delta p$ is the pressure difference across the fibre wall (cm Hg), A is the surface area of the fibre ($cm^2$).

The skin thickness (d) of the asymmetric fibre can be calculated from the reduced permeability by means of equation (2). In this connection, it is assumed that the porous supporting layer has no gas resistance.

$$d = P/P\text{-red} \tag{2}$$

where P represents the permeability to a gas compared with PPO.

The permeability to nitrogen ($N_2$) ($3.8 \times 10^{10}$, Barrer, pages 111-238, Polymer Handbook, second impression, J. Branrup and E. H. Immergut, N.Y. 1975) is used to calculate the top layer or skin thickness.

The gas flows to be measured are directly proportional to the gas pressure, i.e. the gas pressure does not therefore have any effect on the calculated permeability and skin thicknesses.

The measurement results are shown in Table A. Here the weight average ($\bar{M}w$) is set out for various PPO samples against the reduced permeability to nitrogen and oxygen and the calculated skin thickness.

TABLE A

The reduced permeability to oxygen and nitrogen and the skin thickness as a function of the molecular weight of PPO

| No. | Mol. weight (g/mol) | P-red ($O_2$) ($10^{-6}$ cm$^3$/cm$^2 \cdot$ sec $\cdot$ cm Hg) | P-red ($N_2$) | d (micron) |
|---|---|---|---|---|
| 1 | 110000 | 7.5 | 1.9 | 2.0 |
| 2 | 140000 | 30 | 7.5 | 0.5 |
| 3 | 190000 | 37 | 9.5 | 0.4 |
| 4 | 350000 | 50 | 12.5 | 0.3 |

We claim:

1. Method for drying gases comprising passing the gas to be dried through a gas separation apparatus constructed from a module comprising a bundle of hollow fibres consisting of poly(2,6-dimethyl-p-phenylene oxide) and provided with an inlet for the gas mixture to be separated and two outlets for the permeate and retentate respectively, characterized in that the module contains asymmetric hollow fibres of poly(2,6-dimethyl-p-phenylene oxide) having a weight-averaged molecular weight $\bar{M}w$ of $10^5 - 5 \times 10^6$, the asymmetric hollow fibres having a dense nonporous top layer with a thickness of 0.1-2 $\mu$m.

2. Method according to claim 1, characterized in that the asymmetric hollow fibres consisting of poly(2,6-dimethyl-p-phenylene oxide) have an $\bar{M}w$ of $2 \times 10^5 - 8 \times 10^5$.

3. Method according to claim 2, characterized in that the asymmetric hollow fibres consisting of poly(2,6-dimethyl-p-phenylene oxide) have a dense nonporous top layer having a thickness of 0.1-2 $\mu$m.

4. Method according to claim 3, characterized in that the asymmetric hollow fibres consisting of poly(2,6-dimethyl-p-phenylene oxide) have an $\bar{M}w$ of $2 \times 10^5 - 8 \times 10^5$ and a dense nonporous top layer having a thickness of 0.1-1 $\mu$m.

5. Gas separation apparatus constructed from a module comprising a bundle of hollow fibres consisting of poly(2,6-dimethyl-p-phenylene oxide) and provided with an inlet for the gas mixture to be separated and two outlets for the permeate and retentate respectively, characterized in that the module contains asymmetric hollow fibres consisting of poly(2,6-dimethyl-p-phenylene oxide) having a weight-averaged molecular weight $\bar{M}w$ of $10^5 - 5 \times 10^6$, the asymmetric hollow fibres having a dense nonporous top layer with a thickness of 0.1-2.

6. Gas separation apparatus according to claim 5, characterized in that the asymmetric hollow fibres consisting of poly(2,6-dimethyl-p-phenylene oxide) have an $\bar{M}w$ of $2 \times 10^5 - 8 \times 10^5$.

7. Gas separation apparatus according to claim 6, characterized in that the asymmetric hollow fibres consisting of poly(2,6-dimethyl-p-phenylene oxide) have a dense nonporous top layer having a thickness of 0.1-2 $\mu$m.

8. Gas separation apparatus according to claim 6, characterized in that the asymmetric hollow fibres consisting of poly(2,6-dimethyl-p-phenylene oxide) have an $\bar{M}w$ of $2 \times 10^5 - 8 \times 10^5$ and a dense nonporous top layer having a thickness of 0.1-1 $\mu$m.

9. Asymmetric hollow fibre, characterized in that the fibre is constructed from a composition consisting of poly(2,6-dimethyl-p-phenylene oxide) having an $\bar{M}w$ of $10^5 - 5 \times 10^6$ and the thickness of the dense nonporous top layer is 0.1-5 $\mu$m.

10. Asymmetric hollow fibre according to claim 9, characterized in that the fibre is constructed from a composition consisting of poly(2,6-dimethyl-p-phenylene oxide) having an $\bar{M}w$ of $2 \times 10^5 - 8 \times 10^5$ and the thickness of the dense nonporous top layer is 0.1-2 $\mu$m.

* * * * *

UNITED STATES PATENT AND TRADEMARK OFFICE
CERTIFICATE OF CORRECTION

PATENT NO. : 5,129,920   Page 1 of 2
DATED : July 14, 1992
INVENTOR(S) : Johannes H. M. Albers, Jacob Smid and Arnoldus P. M. Kusters It is certified that error appears in the above-identified patent and that said Letters Patent is hereby corrected as shown below:

Column 1 Line 22 "monooxide" should read --monoxide--.

Column 1 Line 40-41 "substrates" should read --substrate--.

Column 1 Line 59 "membranse" should read --membranes--.

Column 1 Line 63 "selectively" should read --selectivity--.

Column 2 Line 16 "on" should read --in--.

Column 2 Line 27 "membrane" should read --membranes--.

Column 2 Line 46 "as" should read --an--.

Column 3 Line 11 "$10^5 5$" should read --$10^5$-5--.

Column 3 Line 17 "a symmetric" should read --asymmetric--.

Column 3 Line 23 "Terugblic" should read --Terugblik--.

UNITED STATES PATENT AND TRADEMARK OFFICE
CERTIFICATE OF CORRECTION

PATENT NO. : 5,129,920

DATED : July 14, 1992

INVENTOR(S) : Johannes H. M. Albers, Jacob Smid and Arnoldus P. M. Kusters

It is certified that error appears in the above-identified patent and that said Letters Patent is hereby corrected as shown below:

Column 3 Lines 23-24 "Toekomst38" should read --Toekomst "--.

Column 3 Line 40 "to" should read --top--.

Column 4 Line 36 "on" should read --in--.

Claim 5 Line 20 Column 6 "0.1-2." should read --0.1-2 μm--.

Signed and Sealed this

Thirty-first Day of August, 1993

Attest:

BRUCE LEHMAN

*Attesting Officer*  *Commissioner of Patents and Trademarks*